(12) United States Patent
Ahn et al.

(10) Patent No.: US 11,877,204 B2
(45) Date of Patent: Jan. 16, 2024

(54) ELECTRONIC APPARATUS AND METHOD FOR CONTROLLING FUNCTION ON BASIS OF LOCATION AND DIRECTION OF OBJECT

(71) Applicant: Samsung Electronics Co., Ltd., Suwon-si (KR)

(72) Inventors: Jungho Ahn, Suwon-si (KR); Yongjun Son, Suwon-si (KR); Saegee Oh, Suwon-si (KR); Jun Yoo, Suwon-si (KR); Jaeil Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 17/279,344

(22) PCT Filed: Sep. 27, 2019

(86) PCT No.: PCT/KR2019/012617
§ 371 (c)(1),
(2) Date: Mar. 24, 2021

(87) PCT Pub. No.: WO2020/067785
PCT Pub. Date: Apr. 2, 2020

(65) Prior Publication Data
US 2021/0409896 A1 Dec. 30, 2021

(30) Foreign Application Priority Data
Sep. 28, 2018 (KR) .................. 10-2018-0116379

(51) Int. Cl.
*H04W 4/021* (2018.01)
*H04W 4/029* (2018.01)
(Continued)

(52) U.S. Cl.
CPC ............ *H04W 4/021* (2013.01); *H04W 4/026* (2013.01); *H04W 4/029* (2018.02); *H04W 4/80* (2018.02)

(58) Field of Classification Search
CPC ........ H04W 4/021; H04W 4/029; H04W 4/80
(Continued)

(56) References Cited

U.S. PATENT DOCUMENTS

2016/0205501 A1    7/2016   Lee et al.
2016/0295364 A1*   10/2016   Zakaria ............. H04M 1/72415
(Continued)

FOREIGN PATENT DOCUMENTS

KR   10-2012-0047539 A    5/2012
KR   10-2015-0011870 A    2/2015
(Continued)

OTHER PUBLICATIONS

Korean Office Action dated Jun. 1, 2023, issued in Korean Application No. 10-2018-0116379.
(Continued)

*Primary Examiner* — William Nealon
(74) *Attorney, Agent, or Firm* — Jefferson IP Law, LLP

(57) ABSTRACT

An electronic apparatus according to various embodiments comprises: a wireless communication circuit comprising a broadband communication module and a Bluetooth communication module; a processor; and a memory operationally connected to the wireless communication circuit, wherein the memory may store instructions for controlling the processor, when executed, to measure a distance from a mobile device on the basis of a first signal transmitted and received through the broadband communication module, determine a direction in which the mobile device is located according to whether a second signal transmitted and received through the Bluetooth communication module is measurable, and (Continued)

control execution of a function of the electronic apparatus according to the determined direction of the mobile device when the measured distance of the mobile device is located in an area set for the execution of the function.

13 Claims, 8 Drawing Sheets

(51) Int. Cl.
*H04W 4/80* (2018.01)
*H04W 4/02* (2018.01)

(58) Field of Classification Search
USPC .................................................. 455/456.1
See application file for complete search history.

(56) References Cited

U.S. PATENT DOCUMENTS

| | | | |
|---|---|---|---|
| 2018/0052217 A1* | 2/2018 | Jonsson | G01S 3/46 |
| 2018/0099643 A1 | 4/2018 | Golsch et al. | |
| 2018/0315262 A1* | 11/2018 | Love | G07C 9/00309 |
| 2019/0024438 A1* | 1/2019 | Budd | G07C 9/28 |
| 2019/0072661 A1 | 3/2019 | Jeon et al. | |
| 2021/0115704 A1* | 4/2021 | Brown | E05B 47/0012 |

FOREIGN PATENT DOCUMENTS

| | | |
|---|---|---|
| KR | 10-2017-0071869 A | 6/2017 |
| KR | 10-2017-0121018 A | 11/2017 |
| KR | 10-2017-0130440 A | 11/2017 |
| WO | 2015/030520 A1 | 3/2015 |
| WO | 2017/057832 A1 | 4/2017 |
| WO | 2017/155231 A1 | 9/2017 |

OTHER PUBLICATIONS

Korean Office Action with English translation dated Sep. 4, 2023; Korean Appln. No. 10-2018-0116379.

* cited by examiner

ELECTRONIC APPARATUS AND METHOD FOR CONTROLLING FUNCTION ON BASIS OF LOCATION AND DIRECTION OF OBJECT

TECHNICAL FIELD

Various embodiments relate to an electronic device and a method for controlling a function based on the location and direction of an object.

BACKGROUND ART

The Internet of things (IoT) refers to an intelligent technology/service for connecting all things such that information can be exchanged between a person and a thing or between things. The IoT technology has recently been applied to various electronic devices such that, by tracking the location of things, real-time location management and low-power monitoring services are provided in various fields.

For example, besides mechanical access control systems using physical keys, digital door lock devices using electronic technologies are widely used. The IoT technology is applicable to a service for tracking the location of a user such that a door can be opened/closed automatically.

DISCLOSURE OF INVENTION

Technical Problem

Object location tracking may be classified into a location tracking service based on a mobile communication network and a location tracking service based on a short-range communication network. However, there is a problem in that, although a fixed device used for location tracking based on the short-range communication network may be able to track the distance from a moving object (for example, a mobile device) and to identify the location thereof, the same cannot distinguish the directionality regarding the location of objects existing at the same distance.

Various embodiments seek to provide an electronic device and a method for determining the movement directionality regarding an object (for example, a mobile device), distinguishing the direction in which the mobile device is positioned, and controlling a function of the electronic device or a mutual function with another electronic device.

Solution to Problem

An electronic device according to various embodiments may include: a wireless communication circuit including a broadband communication module and a Bluetooth communication module; a processor; and a memory operably connected to the wireless communication circuit and the processor. The memory may be configured to store instructions which, when executed, cause the processor to: measure a distance to a mobile device based on a first signal transmitted or received through the broadband communication module; determine a direction in which the mobile device is located according to whether a second signal transmitted or received through the Bluetooth communication module is measurable; and control execution of a function of the electronic device according to the determined direction of the mobile device when a condition that the measured distance of the mobile device is located in an area configured for execution of the function is satisfied.

An electronic device according to various embodiments may include: a wireless communication circuit including a broadband communication module and a Bluetooth communication module; a processor; and a memory operably connected to the wireless communication circuit and the processor. The memory may store instructions which, when executed, cause the processor to: measure a distance to a mobile device based on a first signal transmitted or received through the broadband communication module; determine a direction in which the mobile device is located according to whether a second signal transmitted or received through the Bluetooth communication module is measurable; when a condition that the measured distance of the mobile device is located in an area configured for execution of a function is satisfied, and when the mobile device is located in a first direction of the configured area, control execution of a first function associated with the mobile device; and when the mobile device is located in a second direction of the configured area, control execution of a second function associated with the mobile device.

A method for controlling a function of an electronic device according to various embodiments may include: measuring a distance to a mobile device based on a first signal transmitted or received through a broadband communication module; determining a direction in which the mobile device is located according to whether a second signal transmitted or received through a Bluetooth communication module is measurable; in a case where a condition that the measured distance of the mobile device is located in an area configured for execution of a function is satisfied, executing a function associated with the mobile device when the mobile device is located in a first direction; and in a case where a condition that the measured distance of the mobile device is located in an area configured for execution of the function is satisfied, controlling not to execute a function associated with the mobile device when the mobile device is located in a second direction.

Advantageous Effects of Invention

An electronic device according to various embodiments may acquire the actual distance of an object by using a broadband signal and may distinguish directionality following the location of the object by using a Bluetooth signal. Accordingly, the electronic device may distinguish not only the distance to the object, but also the direction following the location of the object. The electronic device may reduce the number of ultrawideband communication devices installed to determine the location and distance of objects and may distinguish directionality following the location of objects within the same distance, thereby providing an advantageous effect in that electronic device function execution can be variously controlled.

MODE FOR CARRYING OUT THE INVENTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
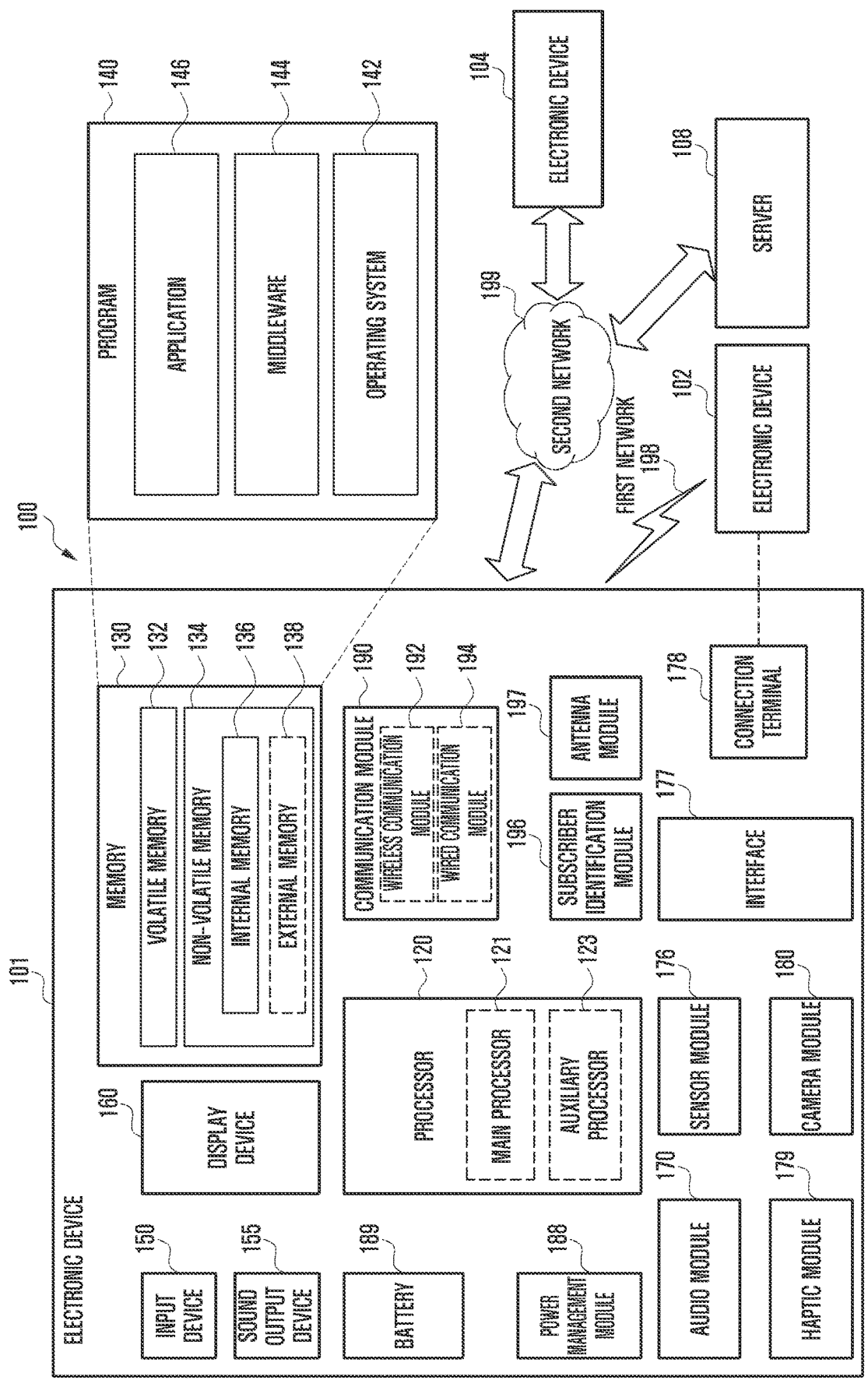
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments of the disclosure may be an electronic device including an Internet-of-Thing (IoT) sensor, a door lock, a doorbell, a smart home device, a device management device, a transportation system, and keys of a transportation means, but may not be limited thereto.

The wireless communication module 192 included in the communication module 190 according to various embodiments may further include a broadband wireless communication module and a Bluetooth communication module.

The electronic device 101 according to various embodiments may measure a distance to a mobile device (or portable device) and track a movement thereof based on a broadband signal, and distinguish a direction (or directionality) of the location of a mobile device based on a Bluetooth signal. The electronic device may control execution of a function associated with the mobile device by distinguishing the locations and the directions of the mobile device.

The electronic device 101 according to various embodiments may perform control to execute a function associated with a mobile device when the mobile device is in a first direction while satisfying a condition of being located in a trigger area configured for execution of the function, and may perform control not to execute the function associated with the mobile device when the mobile device is in a second direction. For example, when the electronic device 101 is installed in a place where inside/outside or indoor/outdoor are distinguished, the electronic device 101 may determine that the mobile device is in a first direction when the mobile device is located in the same direction or area as that in which the electronic device 101 is installed, and may determine that the mobile device is in a second direction when the mobile device is located in a direction or area different from that in which the electronic device 101 is installed.

The electronic device 101 according to various embodiments may perform control to execute a first function when a mobile device moves from the outside of a trigger area configured for execution of a function to the inside thereof while satisfying a condition of being located in a first direction, and may perform control to execute a second function when the mobile device moves from the inside of the trigger area to the outside thereof.

The electronic device 101 according to various embodiments may perform control to execute a first function when a mobile device is located in a first distance in a trigger area configured for execution of a function while satisfying a condition of being located in a first direction, may perform control to execute a second function when the mobile device is located in a second distance, and may perform control to execute a third function when the mobile device is located in a third distance.

The electronic device 101 according to various embodiments of the disclosure may perform control to execute functions of other electronic devices connected to the electronic device 101 when a mobile device is located in a first distance in a trigger area configured for execution of a function while satisfying a condition of being located in a first direction.

Hereinafter, an electronic device capable of controlling functions, based on a location and a direction of a mobile device, by using a short-range communication signal and a Bluetooth signal will be described.

Figure 2:
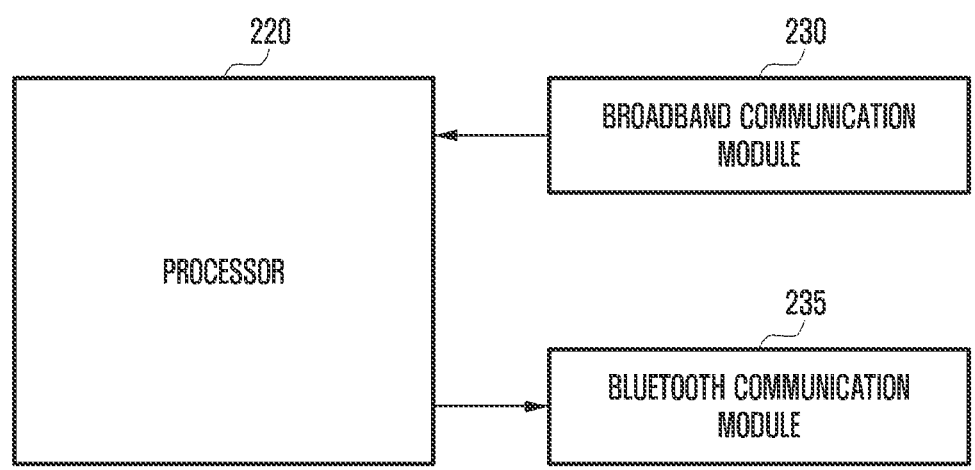
FIG. 2 illustrates a configuration of an electronic device that controls functions by distinguishing locations and directions of an object according to various embodiments.

FIG. 2 illustrates a configuration of an electronic device that controls functions by distinguishing locations and directions of an object according to various embodiments.

Referring to FIG. 2, an electronic device according to various embodiments (e.g., the electronic device 101 of FIG. 1) may include a broadband communication module 230, a Bluetooth communication module 235, and a processor 220 (e.g., the processor 120 of FIG. 1). For example, the broadband communication module 230 and the Bluetooth communication module 235 may be included in an integrated communication circuit (e.g., the communication module 190 of FIG. 1).

According to an embodiment, the broadband communication module 230 may receive and process a broadband signal to transmit data corresponding to the broadband signal to the processor 220, or may transmit the broadband signal to the outside under the control of the processor 220. The broadband communication module 230 may include an ultra-wide band (UWB) communication module for transmitting or receiving a frequency signal of GHz band. In the ultra-wideband communication, information of radio wave per unit time is identified using a broadband bandwidth of GHz band, and thus radio interference due to other communication signals may not occur. For example, in ultra-wideband communication, a low band may have an allocation of 3.1 to 4.8 GHz, and a high band may have an allocation of 7.2 to 10.2 GHz.

According to an embodiment, the Bluetooth communication module 235 may transmit or receive radio frequency signals in a short distance of about 10 m (up to about 100 m) according to the Bluetooth communication standard. The Bluetooth communication module 235 may include a Bluetooth low energy (BLE) communication module. The Bluetooth communication module 235 may receive and process a Bluetooth-based communication signal, may transmit data corresponding to the Bluetooth signal to the processor 220, or may transmit the Bluetooth signal to the outside under the control of the processor 220.

According to an embodiment, the processor 220 may control the broadband communication module 230 and the Bluetooth communication module 235, and may process signals transmitted from the broadband communication module and the Bluetooth communication module. The processor 220 may be an application processor or a main processor. However, when the communication module is integrated into a single chip, the processor may be a processor embedded in the communication module, and may not be limited thereto.

According to an embodiment, the processor 220 may perform control to transmit or receive a broadband signal to or from the mobile device through the broadband communication module 230, and may calculate a distance to the mobile device by analyzing the broadband signal transmitted or received to or from the mobile device and track the movement of the mobile device. The broadband signal may include a time stamp. The time stamp may include information relating to at least one of a time at which the broadband signal is transmitted and a time at which the broadband signal is received.

According to an embodiment, the processor 220 may identify a difference between transmission and reception times of the broadband signal by comparing the transmission time, at which the electronic device transmits the broadband signal, and the reception time, at which the broadband signal is received from the mobile device, based on the time stamp. For example, the processor 220 may measure a distance between the electronic device and the mobile device based on the speed of the broadband signal and the difference between transmission and reception times. For example, the ultra-wideband communication may be a communication scheme in which a location measurement error is in a unit of cm and the precision of location detection is high.

According to an embodiment, the processor 220 may track a change in difference values of the measurement distance of the mobile device, and may identify the location of the mobile device and whether or not the mobile device moves, based on the change in the difference values. For example, the processor 220 may identify that the mobile device is moving toward a direction in which the electronic device is located when the measured location of the mobile device decreases in distance from 2 m to 1 m, for example, or when a change in the distance to the mobile device decreases.

According to an embodiment, the processor 220 may determine whether the location of the mobile device has moved to a trigger area configured for execution of a function. The configured trigger area may be a range configured based on the distance value measured based on the broadband signal. For example, when the trigger area is configured in a radius distance of 1 m around the electronic device, the processor 220 may determine the mobile device to be located within the trigger area when the distance value of the mobile device measured based on the broadband signal has a value of 1 m or less, and may determine the mobile device to be located outside the trigger area when the distance value of the mobile device has a value exceeding 1 m.

According to an embodiment, the processor 200 may estimate the location of the mobile device by using a Bluetooth signal, and may distinguish a direction (or directionality) of the location of the mobile device according to whether or not the signal strength is measurable.

According to an embodiment, the processor 220 may estimate a distance to the mobile device based on an RSSI value of the Bluetooth signal. For example, the RSSI value classifies the signal strengths in a stepwise manner, and the estimated distance may be mapped to correspond to the signal strength. The strength of the signal may weaken as the distance to the mobile device increases. The distance to the mobile device, measured using the RSSI value of the Bluetooth signal, may be used to only estimate the distance corresponding to the signal strength. The processor 220 according to an embodiment may more accurately estimate the actual distance to the mobile device based on the broadband communication signal.

According to an embodiment, the processor 220 may perform control to transmit or receive a Bluetooth communication signal to or from a mobile device through the Bluetooth communication module 235, and may measure an RSSI value of the Bluetooth signal. The processor 220 may determine the direction of the location where the mobile device exists by distinguishing between the case where the RSSI value of the Bluetooth signal is measured and the case where the RSSI value of the Bluetooth signal is not measurable.

According to an embodiment, when the RSSI value of the Bluetooth signal is measured, the processor 220 may recognize that the mobile device is located in a first direction; and when the RSSI value of the Bluetooth signal is not measured, the processor 220 may determine that the mobile device is located in the second direction. For example, in a case where the electronic device is installed in a place where inside and outside or indoor and outdoor are distinguished, the processor 220 may determine the that mobile device is in a first direction when the mobile device is located in the same area or direction as that in which the electronic device is installed, and may determine that the mobile device is in a second direction when the mobile device is located in an area or a direction different from that in which the electronic device is installed. The configuration of the first direction and the second direction may be changed according to a condition and an environment in which the electronic device is installed.

For example, if there are obstacles, transmission or reception of Bluetooth signals may not be smoothly performed. When an electronic device is installed on an exterior wall, a Bluetooth signal generated outside may be received, but it may be difficult to receive a Bluetooth signal generated inside.

According to an embodiment, the processor 220 may perform control: to execute a first function when it is determined that the mobile device has moved into a trigger area, based on a broadband signal, and it is determined that the mobile device is in a first direction, based on a Bluetooth signal; and not to execute the first function when it is determined that the mobile device is in a second direction. For example, the first function may be a function associated with a portable device, but may not be limited thereto. The first direction and the second direction may differ depending on a location where the electronic device is installed, for example, indoor or outdoor. For example, the electronic device is installed in a specific place where inside and outside are distinguished, the first direction may be an outside direction with reference to a place where the electronic device is installed, and the second direction may be an inside direction.

For example, if it is determined that the mobile device is located in a first direction of the trigger area, the processor 220 may perform control to execute a first function associated with the mobile device, for example, unlocking the door; and if the mobile device is located in a second direction, the processor 220 may perform control not to unlock the door even if the mobile device is in the trigger area.

According to another embodiment, the processor 220 may perform control to: execute a first function when it is determined that the mobile device is in a first direction, based on a Bluetooth signal, and it is recognized that the mobile device has moved into a trigger area, based on a broadband signal; and execute a second function in response to the electronic device when it is determined that the mobile device has moved to the outside of the trigger area. In this case, when it is determined that the mobile device is in the second direction, the processor 220 may perform control not to execute either the first function or the second function even if the mobile device is in the trigger area.

For example, when it is determined that the mobile device is located in the first direction (for example, the outside direction) and the distance of the mobile device, measured based on the broadband signal, has moved into the trigger area from the outside of the trigger area, the processor 220 may control other electronic devices connected to the electronic device to be executed in a first operation mode (e.g., a security release mode or a motion detection mode). When it is determined that the mobile device is located in the first direction and the mobile device has moved to the outside of the trigger area from the inside of the trigger area, the processor 220 may control other mobile devices connected to the electronic device to be executed in a second operation mode (e.g., a security configuration mode or a motion detection-release mode).

Figure 3:
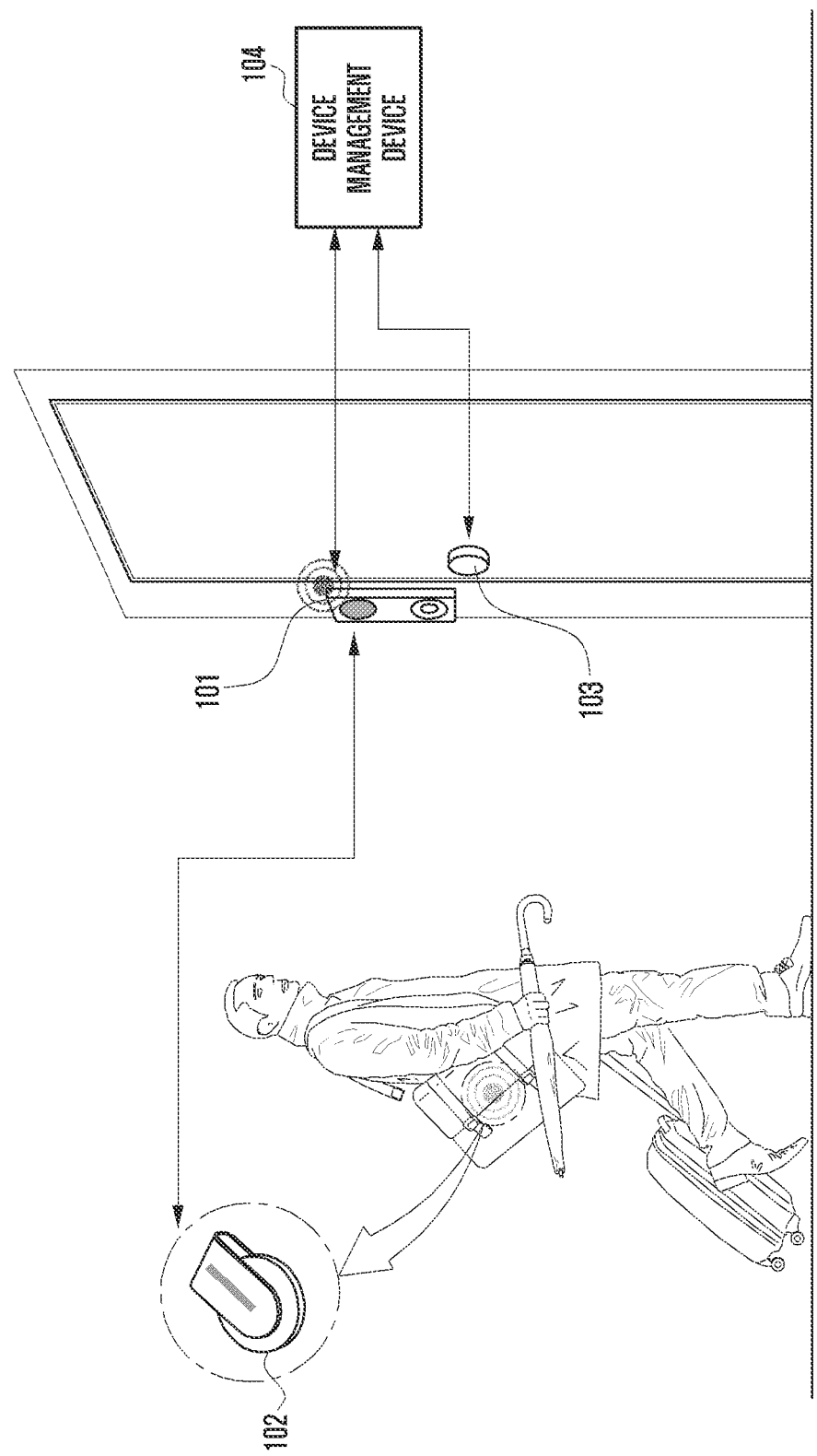
FIG. 3 illustrates a system including an electronic device, a mobile device, and a device management device according to various embodiments.

FIG. 3 illustrates a system including an electronic device, a mobile device, and a device management device according to various embodiments.

Referring to FIG. 3, according to various embodiments of the disclosure, an electronic device 101 (e.g., the electronic device 101 of FIG. 1) for controlling execution of a function based on a location and a direction of an object may operate in communication with a mobile device 102 and a device management device 104. A door lock device 103 may be connected to the device management device 104, but may also be connected to the electronic device 101. For example, the electronic device 101 and the mobile device 102 may be implemented in various devices including IoT sensors, door locks, doorbells, smart home devices, transportation means, and keys of transportation means that can be installed in various places. When the electronic device is an IoT sensor, the mobile device may be an electronic device or smart key device including lock key information. Alternatively, when the electronic device is a vehicle starting system, the mobile device may be a smart key of the vehicle.

According to an example, the electronic device 101 may be a fixed electronic device installed at a specific location, and the mobile device 102 may be a mobile electronic device that can be carried by a user or a tag device that can be tagged on a door lock device.

According to an embodiment, the electronic device 101 and the mobile device 102 may perform broadband communication and Bluetooth communication. Broadband communication and Bluetooth communication may be performed in parallel or independently of each other.

According to an embodiment, the mobile device 102 may be implemented in the same configuration as that of the electronic device 101. However, as shown in FIG. 2, the mobile device 102 may be implemented in a minimal form including only a broadband communication module, a Bluetooth communication module, and a processor. The mobile device 101 may receive a broadband signal and a Bluetooth signal, or transmit the broadband signal and the Bluetooth signal to the outside. For example, the mobile device 101 may perform a function of recording a reception time or a transmission time at which transmission to the outside occurs, in a time stamp included in a broadband signal, to transmit the broadband signal to the outside.

According to an embodiment, the electronic device 101 may measure a distance of a user carrying the mobile device 102 and track the user's movement according to the location. The electronic device 101 may distinguish a direction of the location of the user carrying the mobile device 102 and perform control to execute a function or not to execute the function according to the direction of the location.

The electronic device 101 may determine the directionality of a location where the mobile device 102 exists according to whether or not an RSSI value of the Bluetooth signal is measured. When the RSSI value of the Bluetooth signal is measured, the electronic device 101 may determine that the mobile device 102 is located in a first direction (e.g., the outside direction) with reference to the electronic device 101, and when the RSSI value of the Bluetooth signal is not measured, the electronic device 101 may determine that the mobile device 102 is located in a second direction (e.g., the inside direction) with reference to the electronic device 101. For example, the center of the first direction and the second direction may be identified based on a wall on which the electronic device 101 is installed. The electronic device 101 may determine that the mobile device 102 is in the first direction when it is located in the same area or direction as that in which the electronic device 101 is installed, and may determine that the mobile device 102 is in the second direction when it is located in an area or direction different from that in which the electronic device 101 is installed.

According to an embodiment, the electronic device 101 may perform control: to execute a first function when the mobile device 102 is located in a range configured for execution of a function and is located in a first direction; and not to execute the first function when the mobile device 102 is located in a second direction. For example, in a case where the electronic device 101 is directly connected to the door lock device 103, the electronic device 101 may transmit a command to automatically open the door to the door lock device 103 if the mobile device 102 is located in the trigger area in the first direction. On the other hand, even if the mobile device 102 is located in the trigger area when the mobile device 102 is in the second direction, the electronic device 101 may transmit a command not to open the door to the door lock device 103 or may not transmit a command to open the door to the door lock device 103.

According to another embodiment, the electronic device 101 may transmit a command determined based on the location and the direction of the mobile device 102, for example, a command to execute a first function associated with the mobile device 102 to the device management device 104, or may transmit a command not to execute the first function thereto. The device management device 104 may control the door lock device 103 to be unlocked or locked according to a command transmitted from the electronic device.

According to various embodiments, the electronic device 101 may be connected to the device management device 104 through wireless communication, and may transmit information on the distance and the direction of the mobile device 102 to the device management device 104. The electronic device 101 and the device management device 104 may be connected through wireless communication.

The device management device 104 may be connected to a plurality of other electronic devices (not shown), and may control the operation of the connected plurality of electronic devices. For example, the plurality of electronic devices may include at least one of a door lock device, an air conditioner device, a refrigerator, a washing machine, a TV device, a computer, a lighting device, and/or an audio device, but may not be limited thereto. These electronic devices may be electronic devices installed at a fixed location, such as a house, an office, or a factory, where inside and outside are distinguishable.

According to an embodiment, the device management device 104 may generate an integrated control command of controlling the operation of connected electronic devices, and may transmit the control command to respective electronic devices to control execution of functions for the respective electronic devices.

According to an embodiment, the device management device 104 may control functions of other connected electronic devices to be executed or not to be executed, based on information on the distance and the direction of the mobile device 102, transmitted from the electronic device 101.

According to an embodiment, the device management device 104 may receive authentication information for the mobile device 102 from the electronic device 101. For example, the electronic device 101 may identify identification information (e.g., key information) for authentication of the mobile device 102 based on the signal transmitted from the mobile device 102, and may transmit the identification information to the device management device 104. The device management device 104 may determine whether the mobile device 102 has valid authorization by comparing previously stored information with the identification information of the mobile device 102. The device management device 104 may turn on/off a command for execution of functions of other electronic devices based on the location and the direction of the mobile device 102 when a condition that the mobile device has valid authorization is satisfied.

Figure 4:
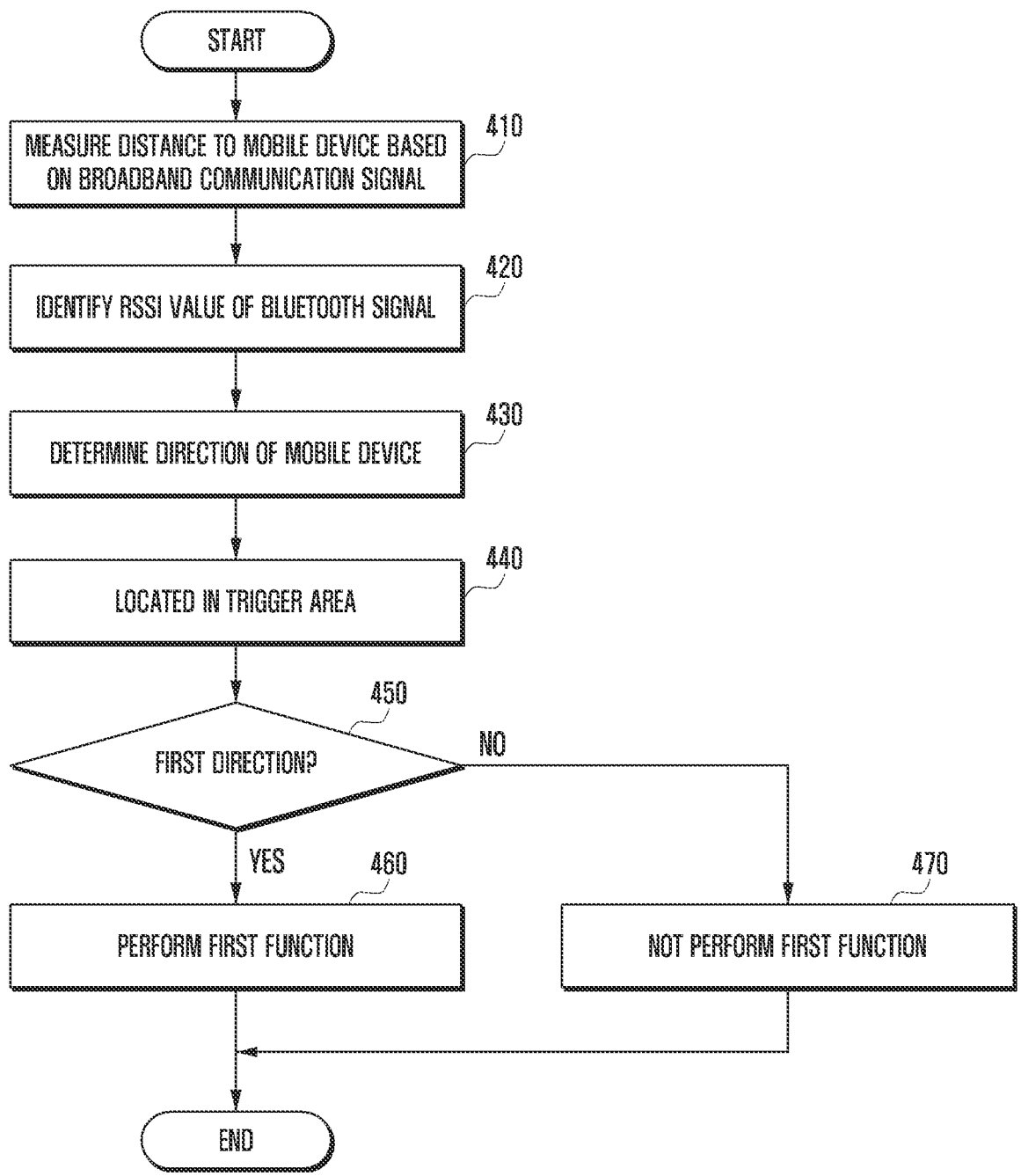
FIG. 4 illustrates a method for controlling a function of an electronic device according to various embodiments.

FIG. 4 illustrates a method for controlling a function of an electronic device according to various embodiments.

Referring to FIG. 4, in operation 410, a processor (for example, the processor 120 of FIG. 1 and the processor 220 of FIG. 2) of an electronic device (the electronic device 101 of FIG. 1) according to various embodiments may measure a distance to a mobile device (for example: the mobile device 102 of FIG. 3) based on a broadband signal which is transmitted or received to or from the mobile device.

For example, the processor may transmit or receive a broadband signal (for example, a UWB signal) including a time stamp to or from the mobile device, may compare the transmission time and reception time included in the time stamp, and may measure a distance between the electronic device and the mobile device based on a difference between transmission and reception times and the speed of the broadband signal.

In operation 420, the processor may identify an RSSI value of the Bluetooth signal. For example, operation 420 and operation 410 may be performed independently of each other or in parallel with each other, the process of operation 410 may proceed to operation 420, and the process of operation 420 may proceed to operation 430.

In operation 430, the processor may determine a direction in which the mobile device is located based on whether or not there is the RSSI value of the Bluetooth signal.

According to an embodiment, when the RSSI value of the Bluetooth signal received from the mobile device is measurable, the processor may determine that the mobile device is located in a first direction with reference to the electronic device, and when the RSSI value is not measurable, the processor may determine that the mobile device is located in a second direction with reference to the electronic device.

According to another example, if the RSSI value of the Bluetooth signal is measurable according to a configuration, the processor may determine that the mobile device is located in a second direction, and if the RSSI value of the Bluetooth signal is not measurable, the processor may determine that the mobile device is located in a first direction. The determination as to the direction of the mobile device may be configured according to a place in which the electronic device is installed.

In operation 440, the processor may determine whether the distance of the mobile device, measured based on the broadband signal, is located in a trigger area for execution of a function. The processor may identify a difference value for the measured distance of the mobile device and track a change in the difference values, and may identify the location of the mobile device or whether or not the mobile device moves, based on the change in the difference values.

In operation 450, the processor may determine whether the mobile device is located in the trigger area and located in the first direction within the trigger area.

According to an embodiment, operation 410 and operation 420, and operation 420 and operation 430 may operate independently of each other or in parallel with each other. In operation 450, the determination may be made by combining a result of determining whether the mobile device is located in a trigger area, based on a broadband signal and a result of determining a direction in which the mobile device is located, based on a Bluetooth signal.

In operation 460, the processor may control to perform a first function when the mobile device is in a first direction in the trigger area. In operation 470, when the mobile device is in a second direction in the trigger area, the processor may control not to perform the first function.

According to an embodiment, the processor may transmit a command to execute the first function to another electronic device connected to an electronic device according to a direction in which the mobile device is located, or may not transmit the command for execution of the first function thereto. Alternatively, when the mobile device is in a second direction in the trigger area, the processor may transmit a command not to execute the first function to another electronic device.

According to an embodiment, in a case where the electronic device is connected to an automatic door locking device, when the mobile device is located in the first direction (e.g., outdoor) in the trigger area, the processor of the electronic device may issue a command to unlock the automatic door locking device. When the mobile device is located in a second direction (for example, indoor) in the trigger area, the processor may issue a command not to unlock the automatic door locking device.

The electronic device according to various embodiments may perform control, by recognizing the directionality of whether the mobile device is located in indoor or outdoor, even if the mobile device including unlock key information is located in the same trigger area, to unlock the door when the mobile device is located outdoor or not to unlock the door when the mobile device is located indoor. For example, even if the user is located within the trigger area for the purpose of finding shoes, objects, etc., rather than for the purpose of moving from indoor to outdoor, the electronic device can suppress door unlocking, which may occur frequently due to the existence of the user in the trigger area.

An electronic device (e.g., the electronic device 101 of FIG. 1) according to various embodiments may include: a wireless communication circuit (e.g., the communication module 190 of FIG. 1) including a broadband communication module (e.g., the broadband communication module 230 of FIG. 2) and a Bluetooth communication module (e.g., the Bluetooth communication module 235 of FIG. 2); a processor (e.g., the processor 120 of FIG. 1 and the processor 220 of FIG. 2); and a memory (e.g., the memory 130 of FIG. 1) operably connected to the wireless communication circuit and the processor, wherein the memory stores instructions which, when executed, cause the processor to: measure a distance to a mobile device based on a first signal transmitted or received through the broadband communication module, determine a direction in which the mobile device is located according to whether or not a second signal transmitted or received through the Bluetooth communication module is measurable, and control execution of a function of the electronic device according to the determined direction of the mobile device when a condition that the measured distance of the mobile device is located in an area configured for execution of the function is satisfied.

The instructions may be configured to cause the processor to: determine that the mobile device is located in a first direction with reference to the electronic device when the second signal is measurable, and determine that the mobile device is located in a second direction with reference to the electronic device when the second signal is not measurable, wherein the first direction and the second direction are directions opposite to each other with reference to an obstacle.

The instructions may be configured to control the processor to execute a first function when the mobile device is located in a first direction, and not to execute the first function when the mobile device is located in a second direction.

The instructions may be configured to cause the processor to: in response to the mobile device being located in an area configured for execution of the function, determine whether the mobile device has valid authorization based on identification information of the mobile device; and execute the first function when a condition that the mobile device has valid authorization is satisfied.

The broadband communication module may include an ultra-wide band communication module, and the Bluetooth communication module may include a Bluetooth low energy communication module.

The electronic device further includes a wireless communication module for performing wireless communication with another electronic device, and the instructions may be configured to control the processor to transmit a command to execute a first function or a command not to execute the first function to another electronic device which is connected to the electronic device via wireless communication.

The instructions may be configured to control the processor to: compare a transmission time at which a first signal transmitted through the broadband communication module with a reception time at which a second signal is received from the mobile device to identify a signal time difference; measure a distance between the electronic device and the mobile device based on signal speeds and the signal time difference; and track the location and movement of the mobile device based on a change in difference values of the measured distance.

The instructions may be configured to control the processor to: upon recognizing that the location of the mobile device is in the first direction, based on the second signal, execute the first function if it is determined that the distance of the mobile device measured based on the first signal moves into the configured area from the outside thereof, and execute the second function if it is determined that the distance of the mobile device moves from inside the configured area to the outside thereof.

The triggering area for execution of the function is divided into a first area having a first radius around the electronic device and a second area having a second radius larger than the first radius, and the instructions may be configured to control the processor to: in a case where the mobile device is located in a first direction based on the second signal, execute a first function when the mobile device is located in a first area based on the first signal, execute a second function when the mobile device is located in a second area other than the first area; and not to execute the first function and the second function when the mobile device is located in a second direction based on the second signal.

Figure 5:
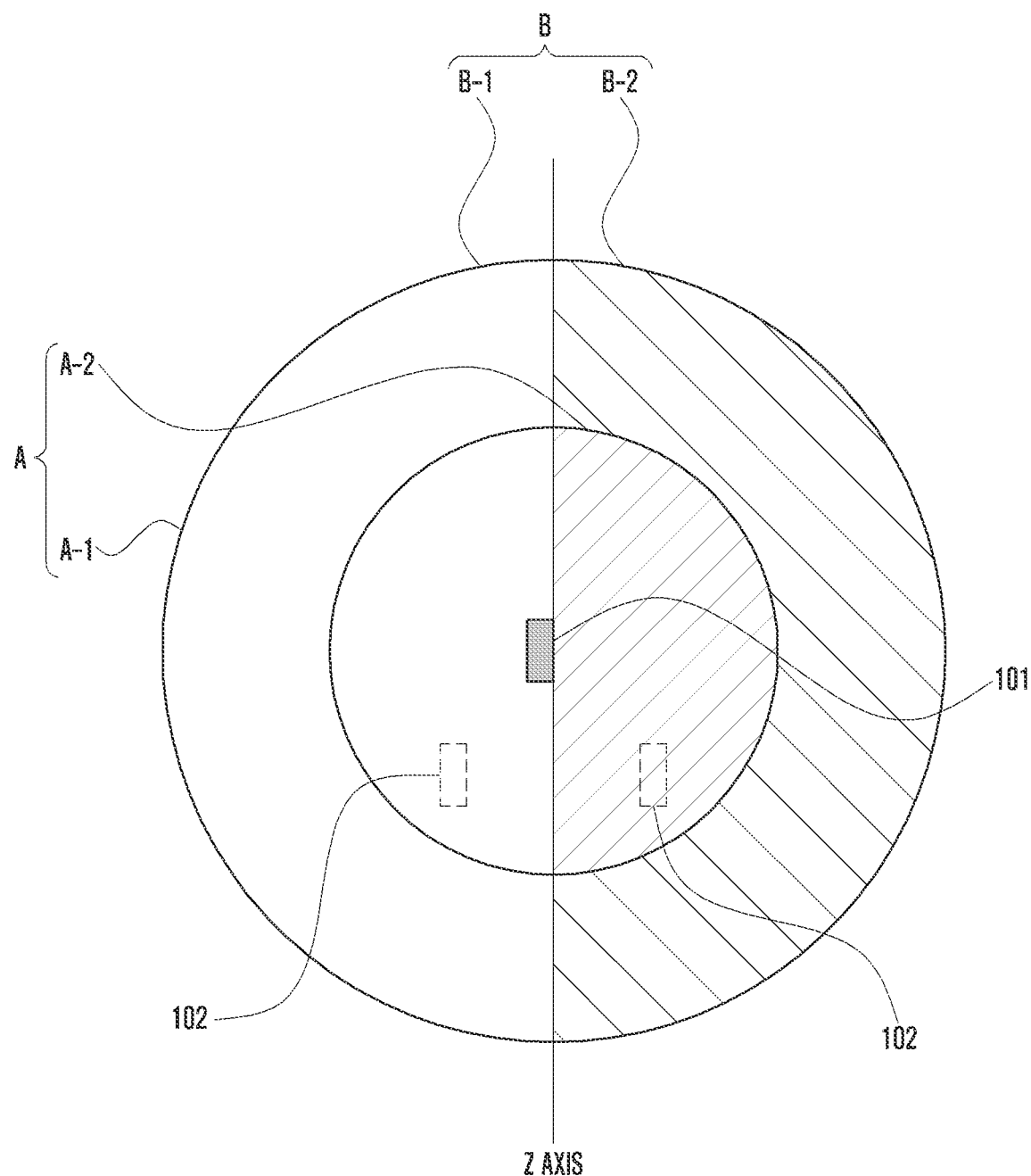
FIG. 5 illustrates an example of a function execution area configured in an electronic device according to various embodiments.

FIG. 5 illustrates an example of a function execution area configured in an electronic device according to various embodiments.

Referring to FIG. 5, the electronic device 101 according to various embodiments may measure a distance to the mobile device 102 and distinguish areas within the same radius so as to distinguish a direction in which the mobile device 102 is located, and may control execution of a function associated with the mobile device 102.

For example, the electronic device 101 may be fixedly installed at a specific location. A Z-axis may be a reference point based on a wall on which the electronic device is configured. The electronic device 101 may recognize whether a distance of the mobile device, measured based on a broadband (UWB) signal, moves into a first radius A configured for execution of a function. Here, a second radius B may be understood as a non-triggering area in which a function associated with a portable device is not performed even when the mobile device is located therein.

The electronic device 101 may identify the directionality of the location of the mobile device by dividing the first radius A according to whether or not an RSSI value of the Bluetooth (BLE) signal generated from the outside is measured. The Bluetooth (BLE) signal may not be smoothly transmitted or received when an obstacle exists.

For example, even if the location of the mobile device 102 measured based on the UWB communication signal is within the first radius A, the electronic device 101 may determine that the mobile device is located in an area A-1 of the first radius if the RSSI value of the Bluetooth signal is measured, and may determine that the mobile device is located in an area A-2 of the first radius if the RSSI value of the Bluetooth signal is not measured.

According to another example, in a case where the electronic device 101 is fixedly located on the interior wall, rather than being fixed on the exterior wall, when the location of the mobile device 102 measured based on the UWB communication signal is in the first radius (A), if the RSSI value of the Bluetooth signal is not measured, the electronic device may determine that the mobile device is located in the area A-1 of the first radius A, and if the RSSI value of the Bluetooth signal is measured, the electronic device may determine that the mobile device is located in the area A-2 of the first radius A.

According to an embodiment, the electronic device 101 may be installed on an interior wall or an exterior wall, but may not be limited thereto. In addition, the electronic device 101 may be installed on a material blocking a Bluetooth signal in a place in which indoor and outdoor spaces are separable. For example, in a case where the electronic device 101 is located on an interior wall, the electronic device 101 may measure the RSSI value of the Bluetooth signal when the mobile device 102 is located indoors. However, in a case where the mobile device 102 is located outdoors, the electronic device may have difficulty in measuring the RSSI value of the Bluetooth signal due to the shielding effect of the wall.

For example, the area A-1 of the first radius A may be in an outside direction with reference to the door, and the area A-2 of the first radius A may be in an inside direction with reference to the door. When the mobile device is located in the area A-1 of the first radius A, the electronic device 101 performs control to open the door, and when the mobile device is located in the area A-2 of the first radius A, the electronic device 101 performs control not to open the door.

The electronic device 101 according to various embodiments may distinguish a range of a trigger area for function configuration, and may control execution of various functions according to directions. For example, the electronic device may configure the trigger area to be a first radius A for execution of a first function and to be a second radius B for execution of a second function.

For example, the electronic device 101 may perform control to execute the first function when the mobile device 102 is located in the area A-1 of the first radius A, and the electronic device 101 may perform control to execute the second function when the mobile device 102 is located in the area B-1 of the second radius B other than the first radius A. Otherwise, the electronic device 101 may perform control not to execute the first function or not to execute the second function even if the mobile device 102 is located in the area A-2 of the first radius A or located in the area B-2 of the second radius B.

An electronic device (e.g., the electronic device 101 of FIG. 1) according to various embodiments may include: a wireless communication circuit (e.g., the communication module 190 of FIG. 1) including a broadband communication module (e.g., the broadband communication module 230 of FIG. 2) and a Bluetooth communication module (e.g., the Bluetooth communication module 235 of FIG. 2); a processor (e.g., the processor 120 of FIG. 1 and the processor 220 of FIG. 2); and a memory (e.g., the memory 130 of FIG. 1) operably connected to the wireless communication circuit and the processor, wherein the memory stores instructions which, when executed, cause the processor to: measure a distance to a mobile device based on a first signal transmitted or received through the broadband communication module; determine a direction in which the mobile device is located according to whether or not a second signal transmitted or received through the Bluetooth communication module is measurable; and in a case where a condition that the measured distance of the mobile device is located in an area configured for execution of a function is satisfied, control execution of a first function associated with the mobile device when the mobile device is located in a first direction of the configured area, and execution of a second function associated with the mobile device when the mobile device is located in a second direction of the configured area.

The instructions may be configured to cause the processor to: in response to the mobile device being located in an area configured for execution of the function, determine whether the mobile device has valid authorization based on identification information of the mobile device; and execute the first function when a condition that the mobile device has valid authorization is satisfied.

The broadband communication module may include an ultra-wide band communication module, and the Bluetooth communication module may include a Bluetooth low energy communication module.

The electronic device further includes a wireless communication module for performing wireless communication with another electronic device, and the instructions may be configured to cause the processor to transmit a command to execute a first function or a command not to execute the first function to another electronic device which is connected to the electronic device via wireless communication.

The instructions may be configured to cause the processor to: upon recognizing that the location of the mobile device is in the first direction, based on the second signal, execute the first function if it is determined that the distance of the mobile device measured based on the first signal moves into the configured area from the outside thereof; and execute the second function if it is determined that the distance of the mobile device moves from inside the configured area to the outside thereof.

The triggering area for execution of the function is divided into a first area having a first radius around the electronic device and a second area having a second radius larger than the first radius, and the instructions may be configured to cause the processor to: in a case where the mobile device is located in a first direction based on the second signal, execute a first function when the mobile device is located in a first area based on the first signal; execute a second function when the mobile device is located in a second area other than the first area; and not to execute the first function or the second function when the mobile device is located in a second direction based on the second signal.

The instructions may be configured to cause the processor to perform an operation of measuring a distance to the mobile device based on the first signal and an operation of determining a direction in which the mobile device is located according to whether or not the second signal is measurable, independently of each other or in parallel with each other.

Figure 6:
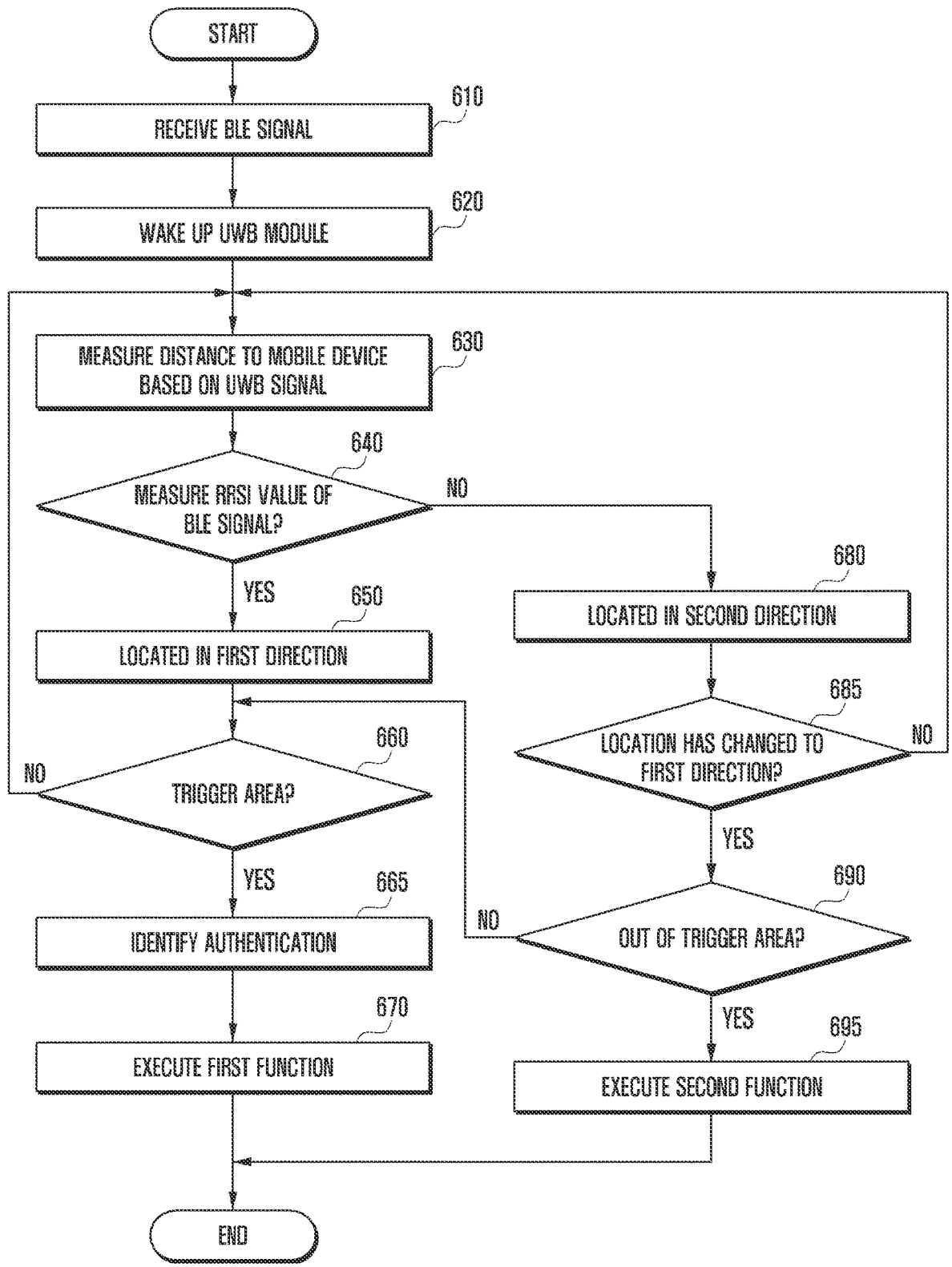
FIG. 6 illustrates a method for controlling a function of an electronic device according to various embodiments.

FIG. 6 illustrates a method for controlling a function of an electronic device according to various embodiments.

Referring to FIG. 6, according to various embodiments, in operation 610, a processor (e.g., the processor 120 of FIG. 1 and the processor 220 of FIG. 2) of the electronic device 101 (e.g., the electronic device 101 of FIG. 1) may receive a Bluetooth low energy (BLE) signal, which is generated at the outside, through a Bluetooth communication module.

According to an embodiment, the electronic device may broadcast a BLE signal through a Bluetooth communication module (e.g., the Bluetooth communication module 235 of FIG. 2), may receive a response signal in response thereto, or may receive a BLE signal broadcasted by another electronic device. For example, the BLE signal received in operation 610 may be a BLE signal by which the mobile device notifies of its own existence.

In operation 620, the processor may control an ultra-wide band (UWB) communication module (e.g., the broadband communication module 230 of FIG. 2) to wake up in response to reception of the BLE signal. The ultra-wideband communication module operates in a sleep mode, and may be changed to an operation mode by a wake-up signal from the processor. For example, in the operation mode, the UWB communication module may receive a UWB signal including a time stamp or may transmit the same outside. The processor may recognize the existence of the mobile device and track the location of the mobile device by receiving the UWB signal transmitted from the mobile device within the communication range of the UWB signal.

In operation 630, the processor may measure a distance to the mobile device based on the UWB signal transmitted or received to or from the mobile device.

According to an embodiment, the electronic device may transmit or receive UWB communication signals to or from other electronic devices based on a time stamp to compare a transmission time and a reception time included in the time stamp, and may measure the distance in which the mobile device is located based on a difference between the transmission time and the reception time and the speed of the signal.

In operation 640, the processor may determine whether or not the RSSI value of the BLE signal of the mobile device, received through the Bluetooth communication module, is measured. The processor may determine a direction, in which the mobile device transmitting the UWB signal is located, according to whether or not the RSSI value of the Bluetooth signal is measured.

According to an embodiment, operations 630 and 640 may be performed independently of each other or in parallel with each other, and may not be limited to the sequence of operations.

In operation 650, when an RSSI value of the BLE signal received from the mobile device is measurable, the processor may determine that the mobile device is located in a first direction with reference to the electronic device. If the RSSI value of the BLE signal received from the mobile device is not measurable, the processor may determine that the mobile device is located in a second direction with reference to the electronic device, in operation 680.

In operation 660, the processor may determine whether another electronic device is located in the first direction and the distance of the mobile device measured based on the UWB signal is located in a trigger area for function execution.

In operation 665, the processor may perform authentication of the mobile device when the distance of the mobile device measured based on the UWB signal is located in the trigger area in the first direction. The processor may identify whether or not the mobile device has valid authorization based on data included in the signal transmitted from the mobile device. For example, the processor receives identification information received from the mobile device, and if the received identification information is identical to the identification information configured in the electronic device, the processor may recognize that the mobile device has valid authorization. The identification information may be key information.

If the distance of the mobile device measured based on the UWB signal in the first direction is not located in the trigger area, the process may proceed to operation 630, and may return to an operation of measuring the distance to the mobile device based on the UWB signal.

In operation 670, the processor may perform control to execute the first function when authorization of the mobile device is verified.

According to an embodiment, the processor may control the electronic device to execute a first function corresponding to the mobile device.

According to an embodiment, the processor may transmit a command to execute the first function to another electronic device connected to the electronic device.

In operation 680, if it is determined that the mobile device is in the second direction, the process proceeds to operation 685 to identify whether the location of the mobile device has changed to be in the first direction. The processor may identify whether the location of the mobile device is in the first direction or the second direction according to whether the RSSI value of the BLE signal is measured.

The process proceeds to operation 690 when it is determined that the location of the mobile device has changed to be in the first direction, and the process proceeds to operation 630 when the location of the mobile device maintains being in the second direction, and may return to an operation of measuring a distance to the mobile device based on the UWB signal.

In operation 690, when the location of the mobile device has changed to be in the first direction, the processor may determine whether the mobile device is out of the trigger area based on the UWB signal.

In operation 695, the processor may perform control to execute a second function when it is determined that the mobile device is out of the trigger area based on the UWB signal. The processor may return to operation 660 when it is determined that the mobile device is in the trigger area without leaving the trigger area in the first direction based on the UWB signal.

According to an embodiment, the first function may be an operation of releasing the security mode of the electronic device, and the second function may be an operation of configuring the security mode of the electronic device.

According to another example, the first function may be an operation of configuring the operation mode of the electronic device, and the second function may be an operation of releasing the operation mode of the electronic device.

According to an embodiment, the processor may transmit information about the location and direction of a portable device to another electronic device for performing wireless communication with the electronic device, and may transmit a command configured to cause the other electronic device to execute a first function or a second function associated with the portable device.

According to various embodiments, a method for controlling a function of an electronic device (e.g., the electronic device 101 of FIG. 1) may include: measuring a distance to a mobile device (e.g., the mobile device 102 of FIG. 3) based on a first signal transmitted or received through a broadband communication module (e.g., the broadband communication module 230 of FIG. 2); determining a direction in which the mobile device is located according to whether or not a second signal transmitted or received through a Bluetooth communication module (e.g., the Bluetooth communication module 235 of FIG. 2) is measurable; in a case where a condition that the measured distance of the mobile device is located in an area configured for execution of the function is satisfied, executing a function associated with the mobile device when the mobile device is located in a first direction; and in a case where a condition that the measured distance of the mobile device is located in an area configured for execution of the function is satisfied, controlling not to execute the function associated with the mobile device when the mobile device is located in a second direction.

The operation of measuring the distance to the mobile device may further include: determining whether the mobile device moves to an area configured for execution of the function; and determining whether the mobile device has valid authorization based on identification information of the mobile device, based on the movement of the mobile device to the configured area, wherein the execution of the function of the electronic device includes execution of the function of the electronic device when a condition that the mobile device has valid authorization is satisfied.

The operation of executing the function associated with the mobile device may further include transmitting a command to execute a function associated with the mobile device to another electronic device which is connected to the electronic device via wireless communication, and the operation of controlling not to execute the function of the electronic device may further include: not transmitting the command to execute the function associated with the mobile device to the other electronic device which is connected to the electronic device via wireless communication; or transmitting a command not to execute the function associated with the mobile device thereto.

The operation of executing the function associated with the mobile device may further include: upon recognizing that the location of the mobile device is in the first direction, based on the second signal, executing the first function if it is determined that the distance of the mobile device measured based on the first signal moves into the configured area from the outside thereof; and upon recognizing that the location of the mobile device is in the first direction, based on the second signal, executing the second function if it is determined that the distance of the mobile device moves from inside the configured area to the outside thereof.

Figure 7:
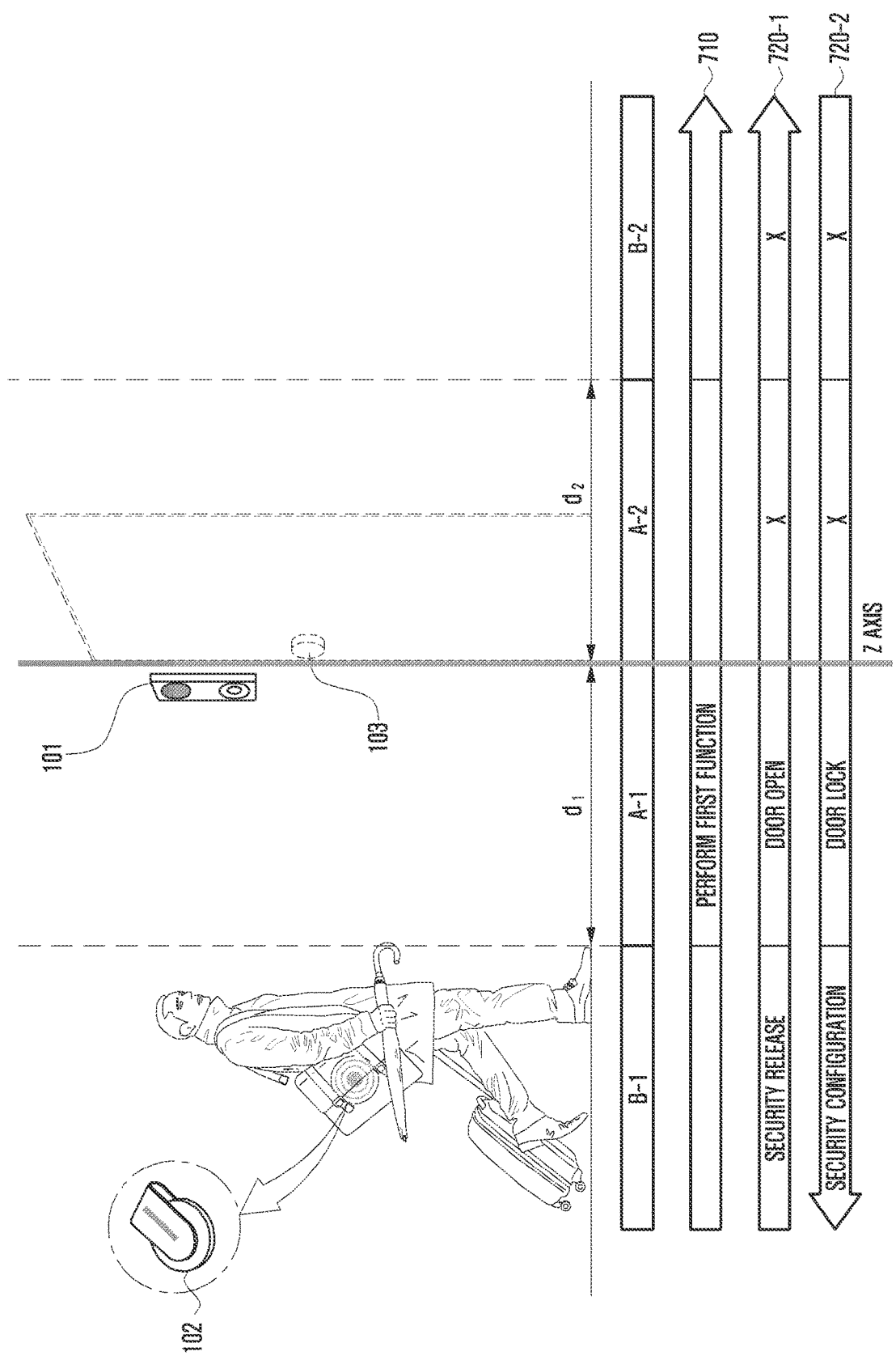
FIG. 7 illustrates an example of controlling execution of a function according to a location and a direction between an electronic device and a mobile device according to various embodiments.

FIG. 7 illustrates an example of controlling execution of a function according to a location and a direction between an electronic device and a mobile device according to various embodiments.

Referring to FIG. 7, according to various embodiments, the electronic device 101 may be an automatic door sensor device, and may be fixedly installed in a specific place (e.g., home, office) in which indoor and outdoor spaces are separable. For convenience of explanation, the electronic device 101 is described as being installed on an exterior wall in a specific place, but the electronic device 101 may be installed on an interior wall in a specific place.

The electronic device 101 may perform broadband communication and Bluetooth communication with the mobile device 102 to track the location of the mobile device and to determine the direction of the location thereof. The electronic device 101 may be connected to the door lock device 103, and may control the function of the door lock device 103 based on the location and the direction of the mobile device 102.

The mobile device 102 is a device carried by a user, and may be a device having the same key information as key information configured in the door lock device 103. For example, the mobile device 102 may be a smart key, a tag device, or the like, or may be a portable device that stores key information of a door lock device, but may not be limited thereto.

According to an embodiment, when the electronic device 101 is installed on the exterior wall of the office, reference numerals A-1 and B-1 in FIG. 7 may indicate an outside of an office, that is, the outside direction, and A-2 and B-2 may indicate an inside of the office, that is, the inside direction.

For example, as in the environment indicated by an arrow 710, when the electronic device 101 configures the distance of the first radius dl to be a trigger area with reference to the electronic device (used as a z-axis), reference numerals A-1 and A-2 may be trigger areas.

When the user moves in a direction from the outside to the inside while carrying the mobile device 102, the electronic device 101 may recognize that the user has moved from the B-1 area to the A-1 area, based on the distance difference value of the mobile device 102 measured by transmitting or receiving UWB signals to or from the mobile device 102.

In addition, the electronic device 101 may determine whether the user is located in A-1 and A-2 directions or B-1 and B-2 directions according to whether or not the RSSI value of the BLE signal from the mobile device 102 is measurable. For example, when the RSSI value of the BLE signal is measured, the electronic device 101 may determine that the user is located in A-1 and A-2 directions (e.g., outside), and when the RSSI value of the BLE signal is not measured, the electronic device may determine that the user is located in B-1 and B-2 directions (e.g., inside).

When the user is located in the distance of B-2, the electronic device 101 may perform control not to execute the first function associated with the mobile device since the user is in the outside direction but is not in the trigger area.

When the user is located in the distance of A-1, the electronic device 101 may perform control to execute the first function associated with the mobile device since the user is in the outside direction and is in the trigger area. That is, the electronic device may perform control to unlock the door lock device by using the key information of the mobile device.

Otherwise, when the user moves from the location B-2 to the location of A-2, the electronic device 101 may perform control not to execute the first function since the user is recognized as being in the inside direction even if the user is in the trigger area. That is, the electronic device may perform control not to unlock the door lock device.

According to another embodiment, as in the environment indicated by arrows 720-1 and 720-2, the electronic device 101 may configure the range of the trigger area in a subdivided manner, and may configure A1 and A-2 to be a first trigger area and configure B-1 and B-2 to be a second trigger area, with reference to the electronic device 101 (used as a Z-axis).

The user may move in a direction from the outside to the inside while carrying the mobile device 102 as indicated by reference numeral 720-1. The electronic device 101 may determine whether the user is located in the outside direction or inside direction based on the BLE signal, and may recognize whether the user is located in the first trigger area or the second trigger area according to the distance value measured based on the UWB signal.

For example, when the user is located in the B-1 area, the electronic device 101 may recognize that the user is in the outside direction and is located in the second trigger area, and may perform control to execute a first function (e.g., a function of releasing a security configuration of the electronic device) configured in the second trigger area.

When the user is located in the second trigger area B-1 in the outside direction and then moves to the area A-1 corresponding to the first trigger area, the electronic device 101 may perform control to execute a first function (e.g., a function of unlocking the door lock device 103) configured in the first trigger area.

According to another example, even if the user is located in the second trigger area B-2 or the first trigger area A-2 in the inside direction, since the electronic device 101 is located in the inside direction, the electronic device may perform control not to execute the security configuration release function or the unlocking function of the door lock device 103.

On the other hand, when the user moves from the inside direction to the outside direction as indicated by reference numeral 720-2, the electronic device 101 may recognize that the user's location has been changed from the location of A-2 to the location A-1 based on the BLE signal. The electronic device 101 may recognize that the user's location has been changed from the first direction to the second direction, and may perform control to execute a second function (for example, a function of configuring locking of the door lock device 103) configured in the first trigger area.

When the user moves from the location A-1 to the location B-1, the electronic device 101 may recognizes that the user has moved to the location A-2 based on the UWB signal, and may perform control to execute the second function configured in the second trigger area (e.g., a function of configuring the security mode of the electronic device).

Figure 8:
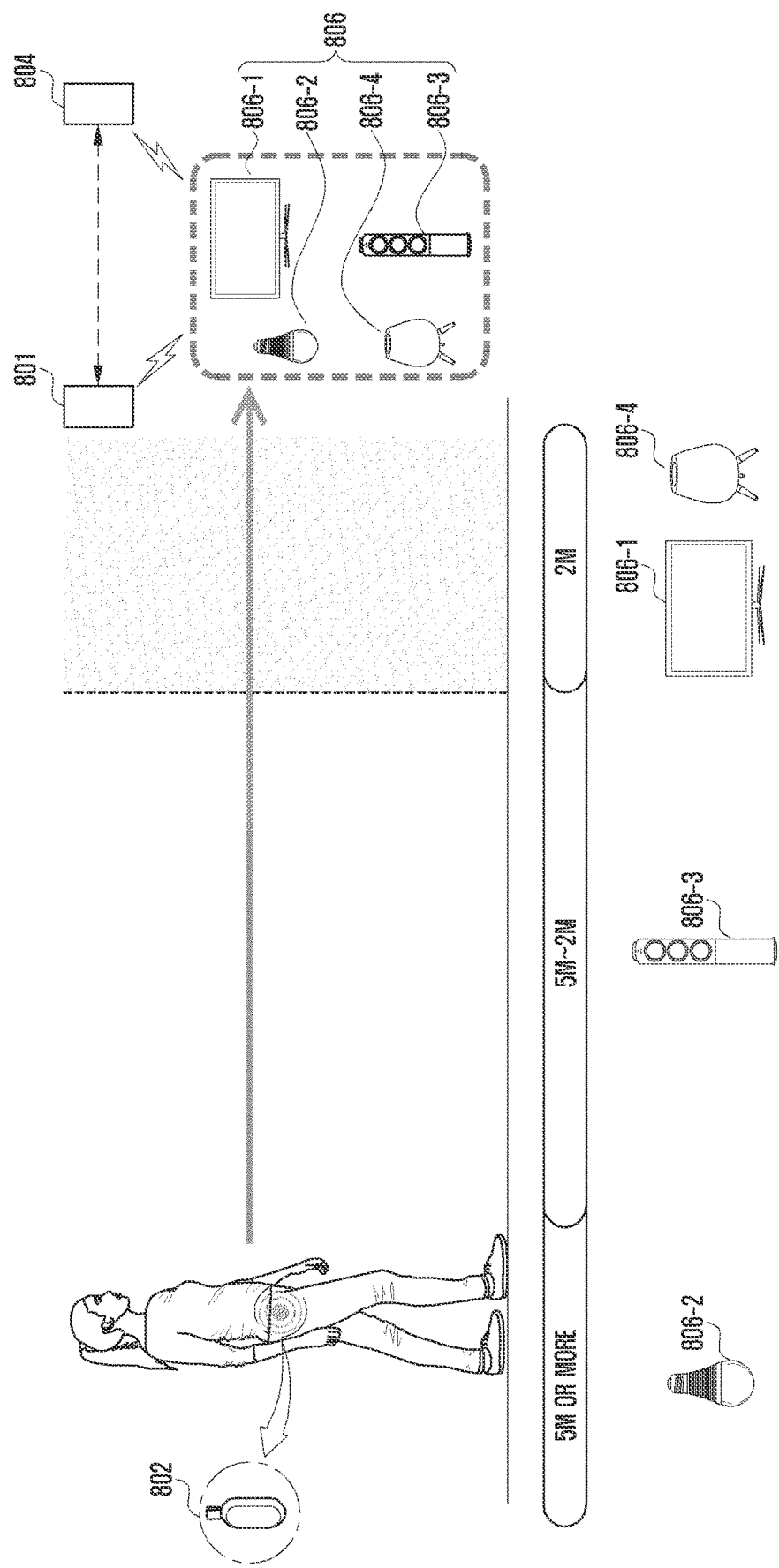
FIG. 8 illustrates an example of controlling execution of a function according to a location and a direction between an electronic device and a mobile device according to various embodiments.

FIG. 8 illustrates an example of controlling execution of a function according to a location and a direction between an electronic device and a mobile device according to various embodiments.

Referring to FIG. 8, according to various embodiments, an electronic device 801 may be connected to a plurality of electronic devices 806. The electronic device 801 may control execution of functions of the plurality of connected other electronic devices 806 based on a location, a direction, and a distance of the mobile device 802. The plurality of electronic devices 806 may include at least one of a TV 806-1, a door lock device, a lighting device 806-2, a refrigerator, a washing machine, a TV, a computer, an air conditioner device 806-3, and/or an audio device 806-4, but may not be limited thereto.

According to another embodiment, the electronic device 801 may be connected to a device management device 804 capable of controlling the operation of the plurality of different electronic devices 806, and may transmit information on the location, the direction, and the distance of the mobile device 802 to the device management device 804.

Hereinafter, an example in which the electronic device 801 controls the operation of other electronic devices 806 will be described, but may not be limited thereto. Further, the device management device 804 may also control execution of the functions of the other electronic device 806 according to the information on the location, the direction, and the distance of the mobile device 802, transmitted from the electronic device 801.

The electronic device 801 may recognize that the user is located in the outside direction according to whether or not the RSSI value of the BLE signal received from the mobile device 802 is measurable. Here, the outside direction (or a direction in which the electronic device 801 and the mobile device 802 exist in the same location) may be understood as a trigger area for function execution.

The user may move while carrying the mobile device 802. The electronic device 801 may measure a distance between the mobile device 102 and the electronic device 801 based on the UWB signal, and may control execution of functions of other electronic devices 806, the functions being mapped according to distance values.

For example, if the user is located in a range of 5 meters or more from a place where the electronic device 801 is installed under a condition that the user exists in the outside direction corresponding to the trigger area, the electronic device 801 may trigger a command to turn on the lighting device 806-2, and may transmit the command to the lighting device 806-2. The lighting device 806-2 may be turned on when the user approaches a distance of 5 meters from the house, under the control of the electronic device 801.

When the user is located in a range between 2 m to 5 m from a place where the electronic device 801 is installed, the electronic device 801 may trigger a command to turn on the air conditioner device 806-3, and may transmit the command to the air conditioner device 806-3. The air conditioner device 806-3 may be turned on when the user approaches a distance between 2 m to 5 m from the house, under the control of the electronic device 801.

When the user is located in a range of 2 m from the place where the electronic device 801 is installed, the electronic device 101 may trigger a command to turn on the TV device 806-1 and the audio device 806-4, and may transmit the command to each of the TV device 806-1 and the audio device 806-4. Each of the TV device 806-1 and the audio device 806-4 may be turned on when the user approaches a distance within 2 m from the house, under the control of the electronic device 801.

Hereinafter, although not shown in the drawings, the electronic device 801 may control the door lock device (not shown) to be unlocked when the user approaches a distance within 1 m. On the contrary, when the user exists inside and moves to the outside direction, and thus the distance between the user and the house gradually increases, the electronic device 801 may control execution of a locking configuration of the door lock device, a turn-off function of the TV device 806-1 and the audio device 806-4, a turn-off function of the air conditioner device 806-3, and a turn-off function of the lighting device 806-2, according to the location of the distance.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic apparatus.

The invention claimed is:

1. An electronic device comprising:
    a wireless communication circuit comprising a broadband communication module and a Bluetooth communication module;
    a processor; and
    a memory operably connected to the wireless communication circuit and the processor,
    wherein the memory stores instructions which, when executed, cause the processor to:
        measure a distance between a mobile device and the electronic device based on a first signal transmitted or received through the broadband communication module,
        determine a direction in which the mobile device is located according to whether a second signal transmitted or received through the Bluetooth communication module is measurable, and
        control execution of a function of the electronic device when a location of the mobile device is in a first direction and a condition that the measured distance is located in an area configured for execution of the function is satisfied, and
    wherein the instructions are configured to cause the processor to, as an operation of measuring the distance between the mobile device and the electronic device,
        identify a time difference between transmission and reception times of the first signal by comparing the transmission time, at which the electronic device transmits the first signal, and the reception time, at which the first signal is received from the mobile device,
        measure the distance between the electronic device and the mobile device based on signal speeds and the time difference, and
        track the location and a movement of the mobile device based on a change in difference values of the measured distance.

2. The electronic device of claim 1,
    wherein the instructions are configured to cause the processor to determine that the mobile device is located in the first direction with reference to the electronic device when the second signal is measurable, and to determine that the mobile device is located in a second direction with reference to the electronic device when the second signal is not measurable, and
    wherein the first direction and the second direction are directions opposite to each other with reference to an obstacle.

3. The electronic device of claim 2, wherein the instructions are configured to cause the processor to execute the function when the mobile device is located in the first direction, and not to execute the function when the mobile device is located in the second direction.

4. The electronic device of claim 2, wherein the instructions are configured to cause the processor to: in response to the mobile device being located in an area configured for execution of the function, determine whether the mobile device has valid authorization based on identification information of the mobile device, and execute the function when a condition that the mobile device has valid authorization is satisfied.

5. The electronic device of claim 1, wherein the broadband communication module includes an ultra-wide band communication module, and the Bluetooth communication module includes a Bluetooth low energy communication module.

6. The electronic device of claim 2, further comprising a wireless communication module for performing wireless communication with another electronic device,
    wherein the instructions are configured to cause the processor to transmit a command to execute the function or a command not to execute the function to another electronic device which is connected to the electronic device via wireless communication.

7. The electronic device of claim 3, wherein the instructions are configured to cause the processor to:
    upon recognizing that the location of the mobile device is in the first direction, based on the second signal, execute a first function if it is determined that the distance of the mobile device measured based on the first signal moves into the configured area from an outside thereof, and
    execute a second function if it is determined that the distance of the mobile device moves from inside the configured area to the outside thereof.

8. The electronic device of claim 2,
    wherein the area for execution of the function is divided into a first area having a first radius around the electronic device and a second area having a second radius larger than the first radius, and
    wherein the instructions are configured to cause the processor to:
        in a case where the mobile device is located in a first direction based on the second signal, execute a first function when the mobile device is located in the first area based on the first signal, and execute a second function when the mobile device is located in a second area other than the first area; and
        not to execute the first function and the second function when the mobile device is located in a second direction based on the second signal.

9. A method for controlling a function of an electronic device, the method comprising:
    measuring a distance to a mobile device based on a first signal transmitted or received through a broadband communication module;
    determining a direction in which the mobile device is located according to whether a second signal transmitted or received through a Bluetooth communication module is measurable;
    in a case where a condition that the measured distance of the mobile device is located in an area configured for execution of a function is satisfied, executing a function associated with the mobile device when the mobile device is located in a first direction; and
    in a case where a condition that the measured distance of the mobile device is located in the area configured for execution of the function is satisfied, controlling not to execute a function associated with the mobile device when the mobile device is located in a second direction,
    wherein the measuring of the distance to the mobile device further comprises:
        determining whether the mobile device moves to the area configured for execution of the function; and
        determining whether the mobile device has valid authorization based on identification information of the mobile device, based on the movement of the mobile device to the configured area, and
    wherein the executing of the function of the electronic device comprises executing of the function of the electronic device when a condition that the mobile device has valid authorization is satisfied.

10. The method of claim 9,
wherein the executing of the function associated with the mobile device further comprises transmitting a command to execute a function associated with the mobile device to another electronic device which is connected to the electronic device via wireless communication, and
wherein the controlling not to execute the function of the electronic device further comprises: not transmitting the command to execute the function associated with the mobile device to another electronic device which is connected to the electronic device via wireless communication; or transmitting a command not to execute the function associated with the mobile device thereto.

11. The method of claim 9, wherein the executing of the function associated with the mobile device further comprises:
upon recognizing that the location of the mobile device is in the first direction, based on the second signal, executing a first function if it is determined that the distance of the mobile device measured based on the first signal moves into the configured area from an outside thereof; and
upon recognizing that the location of the mobile device is in the first direction, based on the second signal, executing a second function if it is determined that the distance of the mobile device moves from inside the configured area to the outside thereof.

12. The method of claim 9, wherein the executing of the function associated with the mobile device further comprises transmitting a command to execute a first function to another electronic device which is connected to the electronic device via wireless communication or transmitting a command not to execute the first function thereto.

13. The method of claim 9,
wherein the area configured for execution of the function is divided into a first area having a first radius around the electronic device and a second area having a second radius larger than the first radius, and
wherein the executing of the function associated with the mobile device further comprises:
in a case where the mobile device is located in a first direction based on the second signal, performing control to execute a first function when the mobile device is located in a first area based on the first signal;
executing a second function when the mobile device is located in a second area other than the first area; and
performing control not to execute the first function or the second function when the mobile device is located in a second direction based on the second signal.

* * * * *